US007310630B2

(12) United States Patent
Furuhashi et al.

(10) Patent No.: US 7,310,630 B2
(45) Date of Patent: Dec. 18, 2007

(54) MULTIMEDIA-OBJECT-RETRIEVING METHOD AND SYSTEM

(75) Inventors: Yukihito Furuhashi, Hachioji (JP); Hiroshi Matsuzaki, Hachioji (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 330 days.

(21) Appl. No.: 10/278,358

(22) Filed: Oct. 23, 2002

(65) Prior Publication Data

US 2003/0084064 A1 May 1, 2003

(30) Foreign Application Priority Data

Oct. 29, 2001 (JP) ............... 2001-331347

(51) Int. Cl.
*G06F 17/30* (2006.01)
*G06K 9/54* (2006.01)
(52) U.S. Cl. .......................... 707/3; 382/305
(58) Field of Classification Search ............. 707/1–10, 707/100–104.1
See application file for complete search history.

(56) References Cited

U.S. PATENT DOCUMENTS

| | | | | |
|---|---|---|---|---|
| 6,097,389 | A * | 8/2000 | Morris et al. ............... | 715/804 |
| 6,643,643 | B1 * | 11/2003 | Lee et al. ................... | 707/5 |
| 2002/0165814 | A1 * | 11/2002 | Lee et al. ................... | 705/37 |

FOREIGN PATENT DOCUMENTS

| | | |
|---|---|---|
| JP | 7-21198 | 1/1995 |
| JP | 9-101970 | 4/1997 |
| JP | 10-154149 | 6/1998 |

OTHER PUBLICATIONS

Rui et al. ("A Relevance Feedback Architecture for Content-based Multimedia Information Retrieval Systems", IEEE, 1997, pp. 82-89).*

* cited by examiner

*Primary Examiner*—Joon Hwan Hwang
(74) *Attorney, Agent, or Firm*—Scully, Scott, Murphy & Presser, P.C.

(57) ABSTRACT

An inputting/designating section inputs a multimedia object or designates a multimedia object previously stored in a database. A feature-value-determining section determines the feature value of the input or designated multimedia object. A weighting-factor-determining section determines the determined feature-value weighting factor of the multimedia object. A similarity-retrieval section retrieves the similarity of the multimedia object previously stored in the database by using the determined feature value and the determined feature-value weighting factor. A displaying section displays a multimedia object similar to the multimedia object designated by the inputting/designating section in accordance with the result of similarity retrieval. A similarity-ranking-changing section changes similarity rankings of the displayed multimedia object. A similarity-recalculating section recalculates the feature-value weighting factor of the multimedia object in accordance with the changed similarity ranking and recalculates a similarity by using the feature-value weighting factor.

4 Claims, 8 Drawing Sheets

MULTIMEDIA-OBJECT-RETRIEVING METHOD AND SYSTEM

CROSS-REFERENCE TO RELATED APPLICATIONS

This application is based upon and claims the benefit of priority from the prior Japanese Patent Application No. 2001-331347, filed Oct. 29, 2001, the entire contents of which are incorporated herein by reference.

BACKGROUND OF THE INVENTION

1. Field of the Invention

The present invention relates to a multimedia-object-retrieving method and system, particularly to a multimedia-object-retrieval method and system for retrieving similar multimedia objects in accordance with feature values of the multimedia objects.

2. Description of the Related Art

Multimedia-object data for images, movies, voices, and music serving as digital data is recently being used in various application.

For example, in the case of data for expressing a three-dimensional object, the following are actively used: CAD, merchandise advertisements and digital archives obtained by converting archaeological assets and art objects into three-dimensional object data.

Moreover, much digital image data and digital music data are exchanged through the Internet.

Because these data use have increased, requests for efficiently managing data and efficiently retrieving the data requested by users are raised.

To respond to these requests, various techniques are proposed. Also for the similar-object-retrieval technique, many retrieval methods are proposed in each of which characteristics of a multimedia object are calculated as feature values expressed by numerical values to use a multidimensional vector constituted by these feature values.

In the case of the similar-object retrieval using feature values, a user designates an object desired as a retrieval result and compares the feature value of the object with that of an object entered in a database and thereby, the user can retrieve similar objects.

In this case, it is generally performed to set a weighting factor for expressing the importance of each feature value.

That is, by properly setting a weighting factor so as to reflect the purpose and taste of a user, it is possible to retrieve objects whose colors are different from each other but whose shapes are similar.

A method is proposed which performs efficient retrieval by properly setting the above weighting factor.

For example, Jpn. Pat. Appln. KOKAI Publication No. 7-21198 discloses an image-retrieval method making it possible to adjust the weighting factor of each feature value when calculating similarity by designating a plurality of images similar to a necessary image and a plurality of images not similar to the necessary image.

Moreover, Jpn. Pat. Appln. KOKAI Publication No. 9-101970 discloses an image-retrieval method and an image-retrieval apparatus making it possible to adjust the weighting factor of each feature value when calculating similarity by setting a plurality of images similar to a desired image and a plurality of images not similar to the desired image.

Furthermore, in the case of the above image-retrieval method and image-retrieval apparatus, it is possible to designate a plurality of images similar to a desired image and a plurality of images not similar to the desired image, again out of images displayed as a result of retrieving similar images.

Thus, it is possible to adjust a weighting factor so that it becomes a more-proper weighting factor by repeating the operation of using the result of retrieving similar images as a new input.

Moreover, Jpn. Pat. Appln. KOKAI Publication No. 10-154149 discloses a similar-object-retrieval method and apparatus using means for adding an object probably similar to a reference object designated by a user out of a group of output sample objects and capable of adjusting a weighting factor so that it approaches a more proper weighting factor.

In the case of the above conventional method, it is necessary to classify purposed objects into only two types of whether they are similar to a desired object or not.

However, because most objects respectively have a portion similar to a desired object and a portion not similar to the desired object, it is difficult to clearly classify them into similar objects and not-similar objects.

For example, in the case of the "image-retrieval method" disclosed in Jpn. Pat. Appln. KOKAI Publication No. 7-21198, it is possible to designate a previously presented image as an image similar to a necessary image or an image not similar to the necessary image.

However, it is not easy to determine whether every independent image is similar to a necessary image except for the case in which the image is very similar to a desired image or it is greatly different from the desired image.

Moreover, in the case of the "image-retrieval method and image-retrieval apparatus" disclosed in the above Jpn. Pat. Appln. KOKAI Publication No. 9-101970 and the "similar-object-retrieval method and apparatus" disclosed in the above Jpn. Pat. Appln. KOKAI Publication No. 10-154149, the same difficulty as the above is present in the process for determining whether an image or object is similar to a desired one.

For example, however, it is not very difficult to compare two objects and determine which one is similar to a desired object.

This is because it is allowed to determine only the relative similarity between two objects instead of determining absolute similarities between independent objects.

BRIEF SUMMARY OF THE INVENTION

It is an object of the present invention to provide a multimedia-object-retrieval method and a system capable of efficiently retrieving a desired group of objects by noting the above point, relatively changing similarity rankings of objects ranked as a retrieval result, and converting the purpose of a user into a weighting factor.

To achieve the above object, a first aspect of the present invention provides a multimedia-object-retrieval method comprising:

inputting a multimedia object or designating a multimedia object among multimedia objects previously stored in a database;

determining a feature value of an input or designated multimedia object;

determining a feature-value weighting factor of the multimedia object which is determined the feature value thereof;

retrieving similarities of multimedia objects previously stored in the database by using a determined feature value and a determined feature-value weighing factor;

displaying a multimedia object similar to the designated multimedia object in accordance with the result of the similarity retrieval;

changing similarity rankings of the displayed multimedia object; and recalculating the feature-value weighing factor of the multimedia object in accordance with the changed similarity ranking and recalculating a similarity by using the feature-value weighting factor.

The invention according the first aspect recalculates a feature-value weighting factor and similarity by changing similarity rankings of an optional object output as a retrieval result.

To determine whether a certain object is similar to a desired object, it is necessary to determine up to what degree of difference is allowed. Therefore, it is difficult for a user to clearly recognize the boundary.

In the case of the present invention, because a user can change the similarity rankings concerned by noting only the relative ranking of an object, it is possible to easily determine whether a certain object is similar to a desired object.

In the case of the present invention, because the feature-value weighting factor is automatically recalculated in accordance with a result of the similarity-ranking change performed by a user and the similarity is recalculated, it is possible to present a new retrieval result reflecting the purpose of the similarity ranking change.

In this case, because feature-value weighting factors are changed in accordance with the similarity ranking change that is a local operation, it is possible to adapt the similarity determination according to the above operation to every object.

As a result, the user can obtain a result the same as the result of changing similarity rankings of every object having the same tendency in spite of the local operation. Thus, a desired group of objects can be obtained efficiently.

To achieve the above object, according to a second aspect of the present invention there is provided a multimedia-object-retrieval method according to the first aspect which recalculates similarities between multimedia objects displayed by the above indication in accordance with the result of the above similarity retrieval.

Because the invention according to the second aspect recalculates similarities between displayed multimedia objects, it is possible to present a recalculation result at a high speed.

To achieve the above object, according to a third aspect of the present invention, there is provided a multimedia-object-retrieval method according to the first aspect which recalculates similarities between multimedia objects previously stored in the above database.

The invention according to the third aspect recalculates similarities between multimedia objects previously stored in a database.

To achieve the above object, according to a fourth aspect of the present invention, there is provided a multimedia-object-retrieval method according to the first aspect which recalculates the above similarity by using the feature value of a multimedia object whose similarity rankings are changed due to the above similarity-ranking change and feature values of multimedia objects having similarity rankings before and after the multimedia object whose similarity rankings are changed.

In the case of the invention according to the fourth aspect, a user can easily change similarity rankings while considering only local and relative similarity rankings by using the feature value of an object whose similarity rankings are changed and feature values of objects located before and after the changed similarity ranking of the above object and thereby changing feature-value weighting factors.

To achieve the above object, according to a fifth aspect of the present invention, there is provided a multimedia-object-retrieval method in which the above similarity ranking change conforms to the first aspect for changing similarity rankings of a plurality of multimedia objects.

In the case of the invention according to the fifth aspect, it is possible to change feature-value weighting factors after changing similarity rankings of a plurality of objects so that a state desired by a user can be obtained by changing feature-value weighting factors in accordance with the result of changing similarity rankings of a plurality of objects.

As a result, the user can complete similarity-ranking change so that a desired state can be obtained without minding the sequence for changing similarity rankings of objects.

To achieve the above object, according to a sixth aspect of the present invention, there is provided a multimedia-object-retrieval system comprising:

an inputting/designating section which inputs a multimedia object or designates a multimedia object among multimedia objects previously stored in a database;

a feature-value-determining section which determines a feature value of the multimedia object input or designated by the inputting/designating section;

a weighting-factor-determining section which determines a feature-value weighing factor of the multimedia object which is determined the feature value thereof by the feature-value-determining section;

a similarity-retrieval section which retrieves the similarity of the multimedia objects previously stored in the database by using the feature value determined by the feature-value-determining section and the feature-value-weighing factor determined by the weighing-factor-determining section;

a displaying section which displays a multimedia object similar to the multimedia object designated by the inputting/designating section in accordance with the result of the similarity retrieval by the similarity-retrieval section;

a similarity-ranking-changing section which changes similarity rankings of the multimedia object displayed by the displaying section; and a similarity-recalculating section which recalculates a similarity by recalculating the feature-value weighting factor of the multimedia object in accordance with the similarity ranking changed by the similarity-ranking-changing section and recalculating a similarity by using the feature-value weighting factor.

The invention according to the sixth aspect recalculates a feature-value weighting factor and a similarity by changing the similarity ranking of an optional object output as a retrieval result.

To determine whether a certain object is similar to a desired object, it is necessary to determine up to what degree of difference is allowed. Therefore, it is difficult for a user to clearly recognize the boundary.

In the case of the present invention, a user can change the similarity rankings by noting only the relative ranking of an object. Therefore, it is possible to easily determine whether a certain object is similar to a desired object.

In the case of the present invention, it is possible to automatically recalculate the feature-value weighting factor in accordance with a result of the similarity-ranking change performed by a user and recalculate a similarity. Therefore, it is possible to present a new retrieval result reflecting the purpose of the similarity change.

In this case, because feature-value weighting factors are changed in accordance with the similarity-ranking change that is a local operation, it is possible to adapt the similarity determination according to the above operation to all objects.

As a result, because a user can obtain a result the same as the result of changing similarity rankings of all objects having the same tendency in spite of the local operation, it is possible to efficiently obtain a desired object group.

To achieve the above object, according to a seventh aspect of the present invention, there is provided a multimedia-object-retrieval system according to the sixth aspect in which the similarity-recalculating section recalculates similarities between the multimedia objects displayed by the above displaying section in accordance with the result of the similarity retrieval by the above similarity-retrieval section.

Because the invention according to the seventh aspect recalculates similarities between displayed multimedia objects, it is possible to present a recalculation result at high speed.

To achieve the above object, according to an eighth aspect of the present invention, there is provided a multimedia-object-retrieval system according to the sixth aspect in which the above similarity-recalculating section recalculates similarities between multimedia objects previously stored in the above database.

The invention according to the eighth aspect recalculates similarities between multimedia objects previously stored in a database.

To achieve the above object, according to a ninth aspect of the present invention, there is provided a multimedia-object-retrieval system according to the sixth aspect in which the similarity-recalculating section recalculates similarities by using the feature value of a multimedia object whose similarity rankings are changed by the above similarity-ranking-changing section and feature values of multimedia object having similarity rankings before and after the multimedia object whose similarity rankings are changed.

In the case of the invention of the ninth aspect, a user can easily change similarity rankings while considering only local and relative similarities by using the feature value of an object whose similarity rankings are changed and feature values of the objects located before and after the changed similarity ranking of the above object and thereby changing feature-value weighting factors.

To achieve the above object, according to a tenth aspect of the present invention, there is provided a multimedia-object-retrieval system according to the sixth aspect in which the above similarity-ranking-changing section changes similarity rankings of a plurality of multimedia objects.

In the case of the invention tenth aspect, it is possible to change feature-value weighting factors after changing similarity rankings of a plurality of objects so that a state desired by a user can be obtained by changing feature-value weighting factors in accordance with a result of changing similarity rankings of a plurality of objects.

As a result, the user can complete similarity-ranking change so that a desired state can be obtained without minding the sequence for changing similarity rankings of objects.

To achieve the above object, according to an eleventh aspect of the present invention, there is provided a multi-media-object-retrieval system comprising:

inputting/designating means for inputting a multimedia object or designating a multimedia object among multimedia objects previously stored in a database;

feature-value-determining means for determining a feature value of the multimedia object input or designated by the inputting/designating means;

weighting-factor-determining means for determining a feature-value weighting factor of the multimedia object which is determined the feature value thereof by the feature-value-determining means;

similarity-retrieval means for retrieving the similarity of the multimedia objects previously stored in the database by using the feature value determined by the feature-value-determining means and the feature-value weighting factor determined by the weighting-factor-determining means;

displaying means for displaying a multimedia object similar to the multimedia object designated by the inputting/designating means in accordance with the result of the similarity retrieval by the similarity-retrieval means;

similarity-ranking-changing means for changing similarity rankings of the multimedia object displayed by the displaying means; and similarity-recalculating means for recalculating the feature-value weighting factor of the multimedia object in accordance with the similarity ranking changed by the similarity-ranking-changing means and recalculating a similarity by using the feature-value weighting factor.

The invention according to the eleventh aspect recalculates the feature-value weighting factor and a similarity by changing similarity rankings of an optional object output as a retrieval result.

To determine whether a certain object is similar to a desired object, it is necessary to determine up to what degree of difference is allowed as similarity. Therefore, it is difficult for a user to recognize the boundary.

In the case of the present invention, because the user can change the similarity rankings by noting only the relative ranking of the object, it is possible to easily determine whether a certain object is similar to a desired object.

In the case of the present invention, because a feature-value weighting factor is automatically recalculated in accordance with the result of the similarity-ranking change performed by a user and the similarity is recalculated, it is possible to present a new retrieval result reflecting the purpose of the similarity ranking change.

In this case, because feature-value weighting factors are changed through the similarity-ranking change that is a local operation, it is possible to adapt the similarity determination by the operation to all objects.

As a result, because a user can obtain a result the same as the result of changing similarity rankings of all objects having the same tendency in spite of the local operation, it is possible to efficiently obtain a desired object group.

To achieve the above object, according to a twelfth aspect of the present invention, there is provided a multimedia-object-retrieval system according to the eleventh aspect in which the above similarity-recalculating means recalculates similarities between the multimedia objects displayed by the above displaying means in accordance with a result of the similarity retrieval by the above similarity-retrieval means.

In the case of the invention according to the twelfth aspect, it is possible to present a recalculation result at high speed because similarities between displayed multimedia objects are recalculated.

To achieve the above object, according to a thirteenth aspect of the present invention, there is provided a multi-media-object-retrieval system according to the eleventh aspect in which the above similarity-recalculating means recalculates similarities between multimedia objects previously stored in the above database.

The invention according to the thirteenth aspect recalculates similarities between multimedia objects previously stored in a database.

To achieve the above object, according to a fourteenth aspect of the present invention, there is provided a multimedia-object-retrieval system according to the eleventh aspect in which the above similarity-recalculating means recalculates similarities by using the feature value of a multimedia object whose similarity rankings are changed by the above similarity-ranking-changing means and the feature values of multimedia objects having similarity rankings before and after the multimedia object whose similarity rankings are changed.

In the case of the invention according to the fourteenth aspect, a user can easily change similarity rankings while considering only local and relative similarity rankings by using the feature value of an object whose similarity rankings are changed and feature values of objects located before and after the changed similarity ranking of the above object and thereby changing feature-value weighting factors.

To achieve the above object, according to a fifteenth aspect of the present invention, there is provided a multimedia-object-retrieval system according to the eleventh aspect in which the above similarity-ranking-changing means changes similarity rankings of a plurality of multimedia objects.

In the case of the invention according to the fifteenth aspect, it is possible to change feature-value weighting factors after changing similarity rankings of a plurality of objects so that a state desired by a user can be obtained by changing the feature-value weighting factors in accordance with the result of changing similarity rankings of the objects.

As a result, the user can complete similarity-ranking change so that a desired state can be obtained without considering the sequence for changing similarity rankings of an object.

To achieve the above object, according to a sixteenth aspect of the present invention, there is provided a multimedia-object-retrieval method comprising:

determining a feature value of an input determining multimedia object or a designated multimedia object among multimedia objects previously stored in a database;

determining a feature-value weighting factor of the multimedia object which is determined the feature value thereof;

retrieving similarities of multimedia objects previously stored in the database by using a determined feature value and a determined feature-value weighing factor;

displaying a multimedia object similar to the designated multimedia object in accordance with the result of the similarity retrieval;

changing similarity rankings of the displayed multimedia object; and recalculating the feature-value weighing factor of the multimedia object in accordance with the changed similarity ranking and recalculating a similarity by using the feature-value weighting factor.

To achieve the above object, according to a seventeenth aspect of the present invention, there is provided a multimedia-object-retrieval system comprising:

a feature-value-determining section which determines a feature value of a multimedia object input via a network or a multimedia object designated via a network among multimedia objects previously stored in a database;

a weighting-factor-determining section which determines a feature-value weighing factor of the multimedia object which is determined the feature value thereof by the feature-value-determining section;

a similarity-retrieval section which retrieves the similarity of the multimedia objects previously stored in the database by using the feature value determined by the feature-value-determining section and the feature-value-weighing factor determined by the weighing-factor-determining section;

a displaying section which displays a multimedia object similar to the multimedia object input or designated via the network in accordance with the result of the similarity retrieval by the similarity-retrieval section;

a similarity-ranking-changing section which changes similarity rankings of the multimedia object displayed by the displaying section; and a similarity-recalculating section which recalculates a similarity by recalculating the feature-value weighting factor of the multimedia object in accordance with the similarity ranking changed by the similarity-ranking-changing section and recalculating a similarity by using the feature-value weighting factor.

To achieve the above object, according to an eighteenth aspect of the present invention, there is provided a multimedia-object-retrieval system comprising:

feature-value-determining means for determining a feature value of a multimedia object input via a network or a multimedia object designated via a network among multimedia objects previously stored in a database;

weighting-factor-determining means for determining a feature-value weighting factor of the multimedia object which is determined the feature value thereof by the feature-value-determining means;

similarity-retrieval means for retrieving the similarity of the multimedia objects previously stored in the database by using the feature value determined by the feature-value-determining means and the feature-value weighting factor determined by the weighting-factor-determining means;

displaying means for displaying a multimedia object similar to the multimedia object input or designated via the network in accordance with the result of the similarity retrieval by the similarity-retrieval means;

similarity-ranking-changing means for changing similarity rankings of the multimedia object displayed by the displaying means; and similarity-recalculating means for recalculating the feature-value weighting factor of the multimedia object in accordance with the similarity ranking changed by the similarity-ranking-changing means and recalculating a similarity by using the feature-value weighting factor.

The inventions according the sixteenth to eighteenth aspects each recalculates a feature-value weighting factor and similarity by changing similarity rankings of an optional object output as a retrieval result.

To determine whether a certain object is similar to a desired object, it is necessary to determine up to what degree of difference is allowed. Therefore, it is difficult for a user to clearly recognize the boundary.

In the case of the present inventions, because a user can change the similarity rankings concerned by noting only the relative ranking of an object, it is possible to easily determine whether a certain object is similar to a desired object.

In the case of the present inventions, because the feature-value weighting factor is automatically recalculated in accordance with a result of the similarity-ranking change performed by a user and the similarity is recalculated, it is possible to present a new retrieval result reflecting the purpose of the similarity ranking change.

In this case, because feature-value weighting factors are changed in accordance with the similarity ranking change that is a local operation, it is possible to adapt the similarity determination according to the above operation to every object.

As a result, the user can obtain a result the same as the result of changing similarity rankings of every object having the same tendency in spite of the local operation. Thus, a desired group of objects can be obtained efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Figure 1:
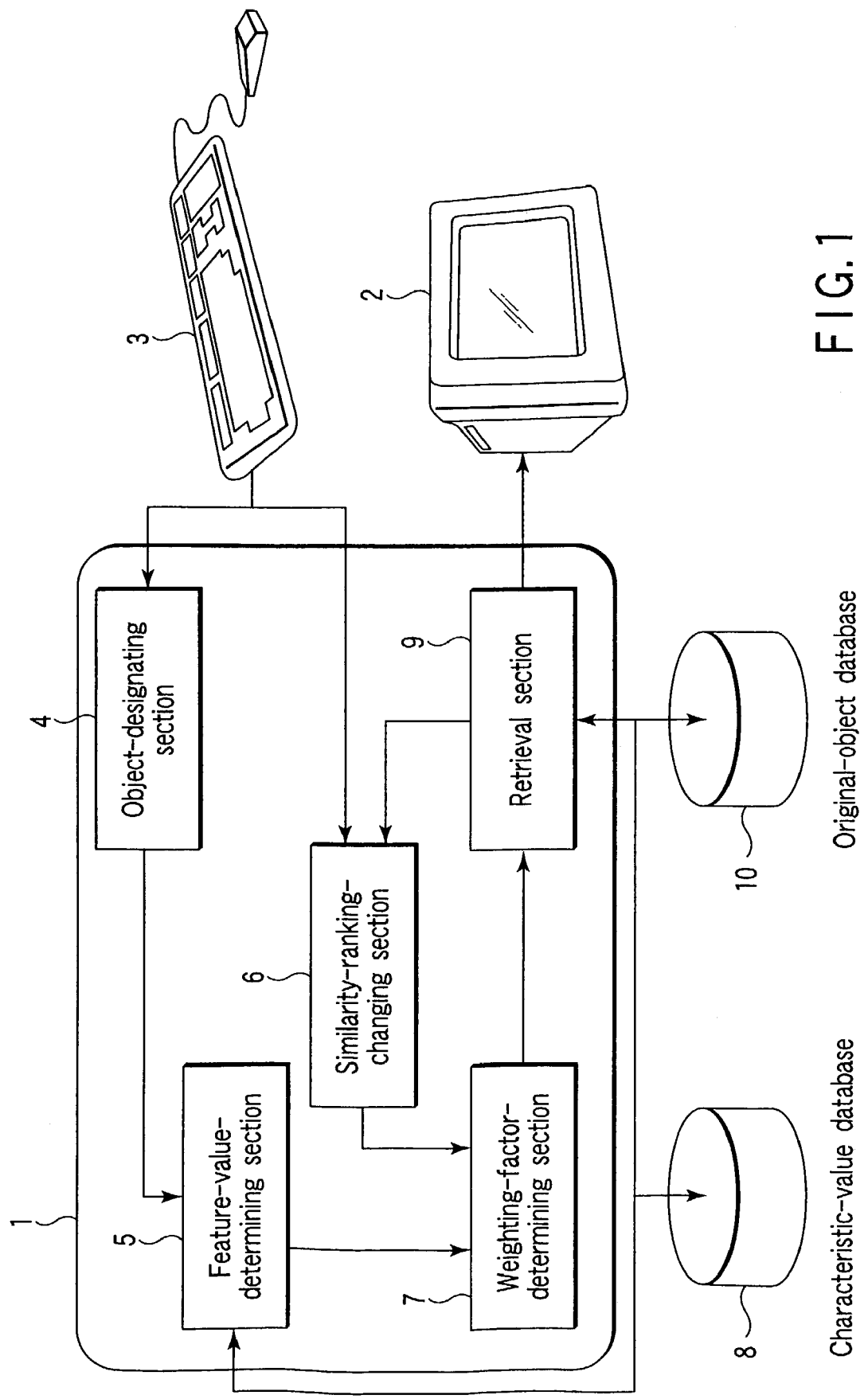
FIG. 1 is a block diagram showing a configuration of a multimedia-object-retrieval method and a system to which a first embodiment of the present invention is applied.

Reference will now be made in detail to the presently preferred embodiments of the invention as illustrated in the accompanying drawings, in which like reference numerals designate like or corresponding parts.

Embodiments of the present invention are described below by referring to the accompanying drawings.

First Embodiment

FIG. 1 is a block diagram showing a configuration of a multimedia-object-retrieval method and a system to which a first embodiment of the present invention is applied.

That is, in FIG. 1, an arithmetic unit 1 is connected to an object-data display unit 2 such as a CRT, LCD display, or three-dimensional display unit and an input unit 3 through which data or an operation is input including a keyboard, mouse, and tablet.

In this case, the inside of the arithmetic unit 1 is configured as described below.

An object-designating section 4 is connected to a feature value-determining section 5.

The feature value-determining section 5 is connected to a weighting-factor-determining section 7.

Moreover, the feature value-determining section 5 is connected to a feature value database 8 through a network.

The weighting-factor-determining section 7 is connected to a retrieval section 9.

The retrieval section 9 is connected to the feature value database 8 and an original-object database 10 through a network.

Moreover, the retrieval section 9 is connected to a similarity-ranking-changing section 6.

The similarity-ranking-changing section 6 is connected to the weighting-factor-determining section 7.

Three-dimensional data for interior articles such as a chair and table is entered in the original-object database 10 as multimedia objects.

Feature values of the multimedia objects entered in the original-object database 10 are entered in the feature value database 10.

In this case, feature values use a histogram obtained by quantizing the value for each color information such as RGB, HSV, or Lab which can be calculated for the texture of a three-dimensional object, a shape histogram obtained by quantizing edge differentiation, and volume or surface area of a three-dimensional object.

It is allowed to use these feature values as feature values separate from each other by selecting them along various portions.

Figure 2:
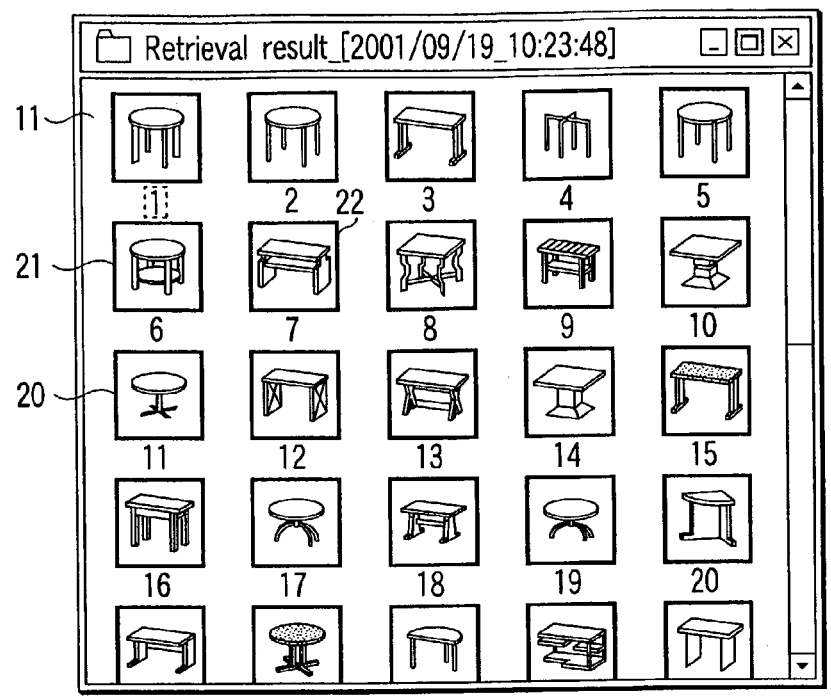
FIG. 2 is an illustration showing indications displayed on a object-data display unit 2 in FIG. 1.
Figure 3:
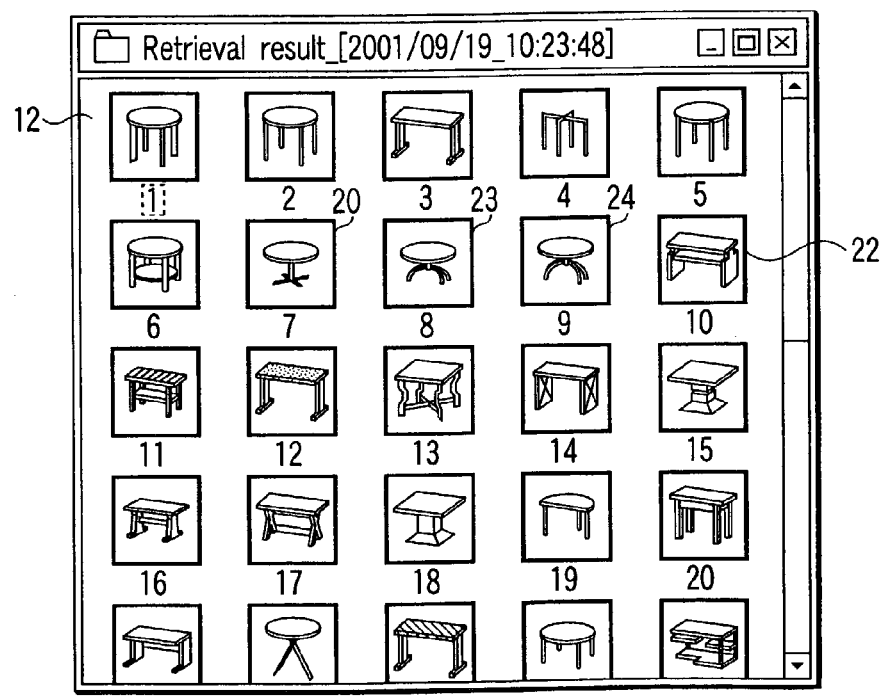
FIG. 3 is an illustration showing indications displayed on the object-data display unit 2 in FIG. 1.

FIGS. 2 and 3 show indications displayed on the object-data display unit 2.

Usually, a window for displaying the objects entered in the original-object database 10 or a window for designating a desired object as a retrieval result is displayed on the screen of the object-data display unit 2.

FIG. 2 shows a window 11 for displaying a retrieval result by retrieving based on a designating result with a window for designating the desired object.

FIG. 3 shows a window 12 for displaying a recalculation result (reretrieval result) of the similarity after changing similarity rankings to the retrieval result displayed on the window 11.

Functions of the first embodiment of the present invention will now be described below.

Figure 4:
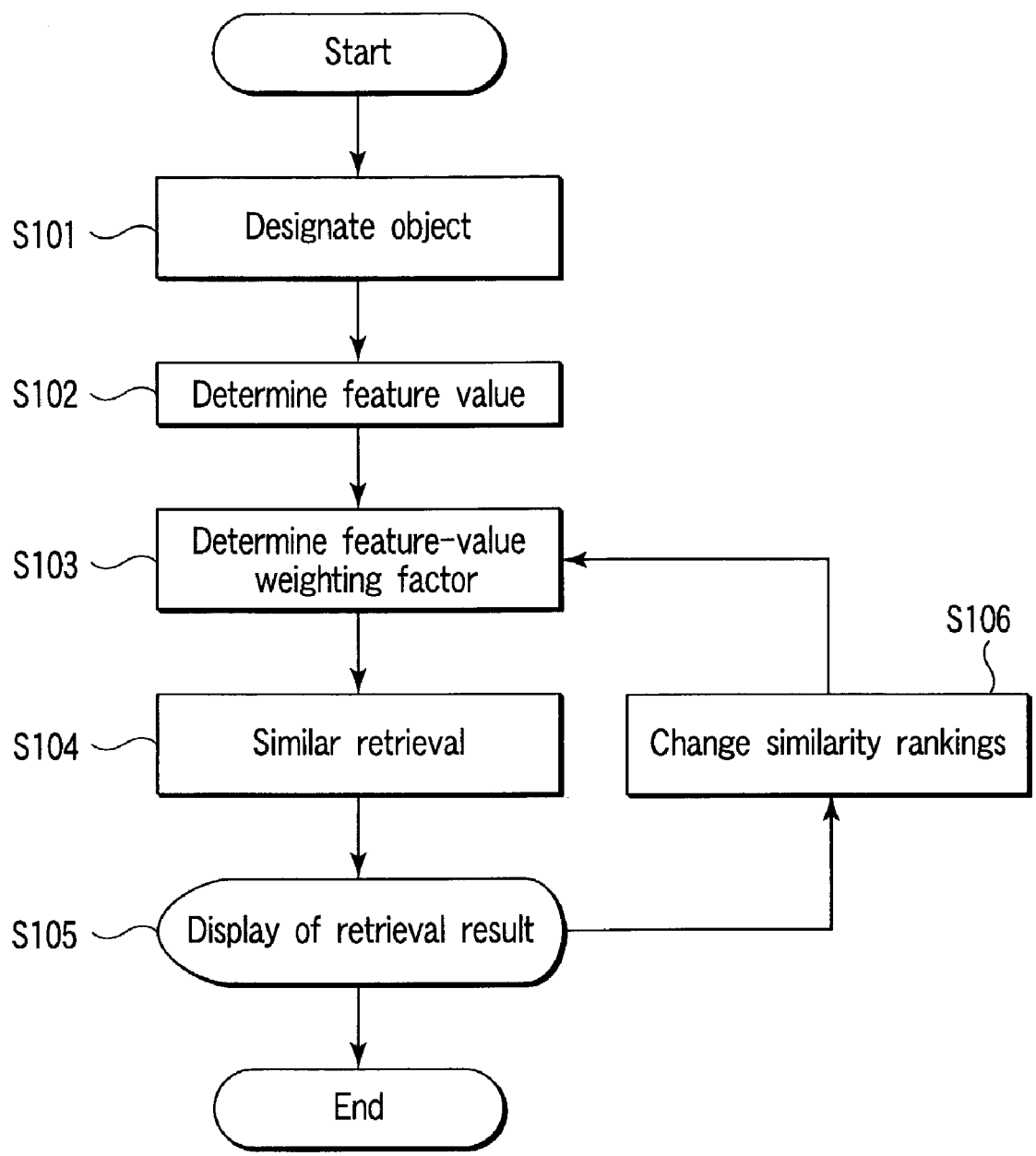
FIG. 4 is a flowchart showing a procedure of operations for explaining functions of the first embodiment of the present invention.

FIG. 4 is a flowchart showing a procedure of operations for explaining functions of the first embodiment of the present invention.

First, in step S101, a user designates a desired object as a retrieval result.

The processing in step S101 is executed by the object-designating section 4 in FIG. 1.

Objects can be designated by designating the objects entered in the original-object database 10 or selecting objects which can be handled by the present apparatus from the open menu of an application.

Then, in step S102, an object feature value representing the above object is determined from the objects designated in the previous step S101.

The processing in step S102 is executed by the feature value-determining section 5 in FIG. 1.

In this case, for objects whose feature values are present in the feature value database 8 among the objects designated in step S101, the feature values are read from the feature value database 8.

Moreover, for objects whose feature values are not present in the feature value database 8 among the objects designated in step S101, the feature values are calculated and determined.

The way of calculating a feature value is common to the operation for constructing the feature value database 8.

The feature value representing the objects designated in step S101 is the average value of feature values of the designated objects.

Then, in step S103, a weighting factor is decided for each of the feature values of the objects determined in the previous step S102.

The processing in step S103 is executed by the weighting-factor-determining section 7 in FIG. 1.

Figure 5:
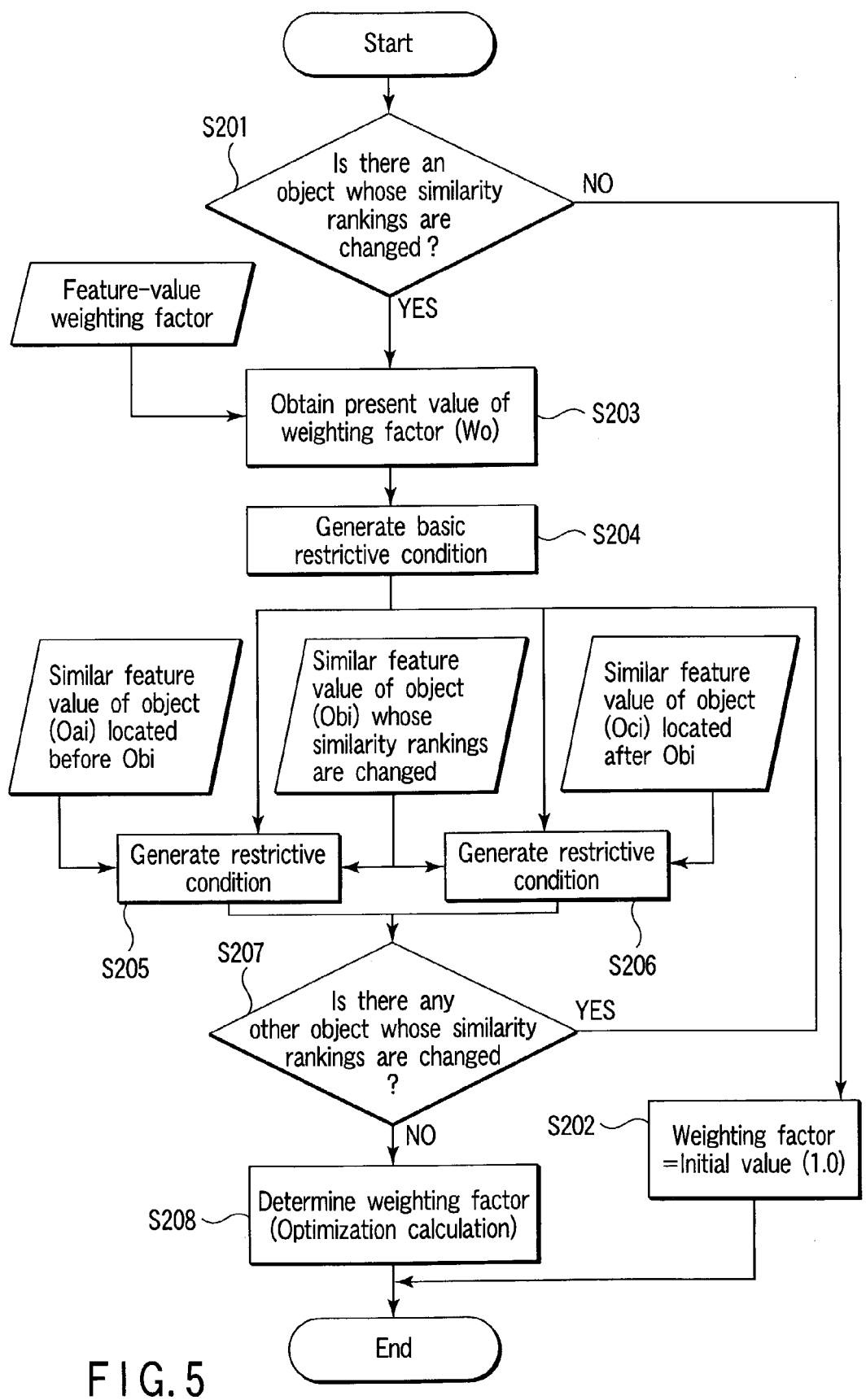
FIG. 5 is a flowchart showing details of the processing in step S103 in FIG. 4.

FIG. 5 is a flowchart showing details of the processing in step S103.

First, in step S201, it is determined whether an object whose similarity rankings are changed is present.

A case in which an object whose similarity rankings are changed is not present corresponds to a state in which retrieval is not executed yet.

In this case, the weighting factor is set as an initial value in step S202.

In the case of this embodiment, the initial value of the weighting factor is set to 1.0 for every feature value.

In the case of this embodiment, by using the sum of squares of the product between each component Fi of the similar feature value of an object k and each component Wi of a weighting factor as a similarity Sk, the similarity ranking further rises as the similarity Sk decreases as shown by the expression (1) to be described later.

A similar feature value denotes a difference between a feature value entered in the feature value database 8 and the feature value of an object representing desired objects determined in the previous step S102.

That is, the similarity Sk is shown by the following expression (1).

$$Sk=(F0W0)^2+(F1W1)^2+\ldots(FnWn)^2 \qquad (1)$$

The expression (1) can be interpreted as the inner product between a vector FS constituted by a value obtained by squaring each component Fi of the similar feature value of the object k and a vector WS constituted by a value obtained by squaring each component Wi of a weighting factor.

In the case of this embodiment, a weighting factor reflecting the purpose of a user according to similarity-ranking change is calculated when optimization is performed by the vectors FS and WS.

In step S203, presently-set weighing factors w0, w1, ..., wn are obtained and a reference weight vector WST serving as a parameter for optimization calculation is set as shown by expression (2).

$$WST=(w0^2, w1^2, \ldots, wn^2) \qquad (2)$$

Then, in step S204, a basic restrictive condition is generated to perform the optimization calculation shown by the following expressions (3) and (4).

In the case of this embodiment, optimization calculation is performed in accordance with the vector FS obtained by squaring each component of a similar feature value, the vector WS obtained by squaring each component of a weighting factor, and the reference weight vector VST, and thereby, an optimum weight vector WSO related an optimum weighting factor is calculated.

However, as is clear from the fact that components of these vectors are squared values, each element of the optimum weight vector WSO must be positive as shown in expression (3).

$$WSOi>=0.0(i=0, 1, \ldots, n) \qquad (3)$$

Moreover, because the upper-limit value of a weighting factor is set to 1.0, each element of the optimum weight vector WSO must be equal to or less than 1.0 as shown by the following expression (4).

$$WSOi<=1.0(i=0, 1, \ldots, n) \qquad (4)$$

Furthermore, the relation between the optimum weight vectors WOi and WSO is shown by the following expression (5).

$$WSO=(WO1^2, WO2^2, \ldots, WOn^2) \qquad (5)$$

Then, in step S205, the restrictive condition shown by the following expression (6) is generated in accordance with a similar characteristic vector FSbj obtained by squaring each element of the similar feature value of an object whose similarity rankings are changed and a similar characteristic vector FSaj obtained by squaring each element of the similar feature value of an object whose similarity ranking is present at a position one level higher than that of the above object.

$$WSO \cdot FSaj < WSO \cdot FSbj \qquad (6)$$

Then, in step S206, the restrictive condition shown by the following expression (7) is generated in accordance with a similar characteristic vector FSbj obtained by squaring each element of the similar feature value of an object whose similarity rankings are changed and a similar characteristic vector FScj obtained by squaring each element of the similar feature value of an object whose similarity ranking is present at a position one level lower than that of the above object in the way same as in the case of the above step S205.

$$WSO \cdot FSbj < WSO \cdot FScj \qquad (7)$$

Then, in step S207, it is determined whether any other object whose similarity rankings are changed is present.

In this case, when an object whose similarity rankings are changed is still present, the processing in steps S205 and S206 is retried to generate the restrictive conditions shown by expressions (6) and (7).

By repeating the processing, the restrictive conditions shown by expressions (6) and (7) are generated by the number of objects whose similarity rankings are changed.

Moreover, when an object whose similarity rankings are changed is not present, a weighting factor is calculated in step S208.

Then, in step S208, because expressions (3), (4), (6) and (7) are restrictive conditions, optimization calculation is performed as a minimum-value problem using expression (8) as an evaluation function, for example, and thereby, the optimum weight vector WSO is calculated, as described later.

$$f(WSO)=-WSO \cdot WST/(|WSO||WST|) \qquad (8)$$

Then, the optimum weighting factor WOi is calculated in accordance with the optimum weight vector WSO and expression (5).

By using SUMT (Sequential Unconstrained Minimization Technique), which is a typical method of the penalty method generally well known as the solution of a constrictive-conditional nonlinear-plan minimum-value problem set for this embodiment as a specific optimizing-calculation method, a restrictive-conditional nonlinear-plan minimum-value problem is converted into an unconstrained nonlinear-plan minimum-value problem.

The conjugate gradient method is used to calculate a minimum point and the golden section method is used for a primary nonlinear-plan minimum-value problem in the conjugate gradient method.

Then, in step S104 in FIG. 4, similar retrieval is performed by using the feature value determined in step S102, the weighting factor determined in step S103, and feature values of all objects entered in the feature value database 8.

For specific similar retrieval, a similarity ranking is decided by calculating expression (1) described for the function in step S207 and sorting values Sk of expression (1) for expressing the similarity of the object k starting with the smallest value Sk.

Then, in step S105, the result of the similar retrieval performed in the step S104 is displayed on the display unit 2 for object data.

Then, in step S106, the user changes similarity rankings through drag-and-drop.

For example, the user can drag and drop a chair 20 having a circular seating face shown in a retrieval-result screen 11 in FIG. 2 between another chair 21 having a circular seating face and still another chair 22 having a quadrangular seating face.

Thus, it is possible to repeat operations a plurality of times so that a similarity ranking purposed by a user can be obtained.

After all operations are completed, processing continues to step S103 by selecting "weighting-factor recalculation" from a menu.

The content of the similarity-ranking change performed in step S106 serves as a condition for calculating the optimum weighting factor in step S103.

Then, a window displaying a result of performing similar retrieval again in step S104 by using a result of recalculating the optimum weighting factor in step S103 is displayed by symbol 12 in FIG. 3.

In a retrieval result screen 12 shown in FIG. 3, as a result of changing similarities of the chair 20 having a circular seating face, chairs 23 and 24 having the same characteristic are located at a position higher than the chair 22 having a quadrangular seating face.

The advantages of embodiments of the present invention will now be described below.

The similarity-ranking change in step S106 can be performed by noting only the relative similarity between an object designated so as to change similarity rankings and an object located at a similarity-ranking-change destination.

When determining an object in accordance with the criterion of whether the object is similar to a desired object, it is difficult for a user to recognize an object located at the boundary between the evaluation that the object is similar to the desired object and the evaluation that the object is not similar to the desired object by himself.

However, it is easy to determine the relative similarity between a certain object and another object like the case of this embodiment.

As a result, the user can easily perform his/her purposed similarity-ranking change and efficiently retrieve an object group similar to the desired object.

Moreover, in the case of the weighting-factor determination performed in step S103, the whole weighting factor is decided through optimization calculation in accordance with the similarity-ranking change locally performed by the user in step S106.

As a result, when the user changes similarity rankings of the chair 20 having a circular seating face between the chair 21 having a circular seating face and the chair 22 having a quadrangular seating face shown by the retrieval-result screen 11 in FIG. 2, the chairs 23 and 23 having the same characteristic as the chair 20 having a circular seating face become higher than the chair 22 having a quadrangular seating face in similarity ranking as shown by the retrieval-result screen 12 in FIG. 3.

Therefore, by changing similarities of some objects and determining weighting factors through optimization calculation, similarity rankings of an object having the same characteristic as the above objects are also changed.

As a result, the user can easily reflect his/her purpose on the whole and efficiently retrieve an object group similar to a desired object by changing similarities of some objects.

Moreover, the feature value database 8 and original object database 10 are not restricted to connection via a network, but it is allowed that the databases 8 and 10 are included in the arithmetic unit 1.

Furthermore, it is allowed that the internal configuration of the arithmetic unit 1 is distributed on a network.

Furthermore, the feature-value data entered in the feature value database 8 is not restricted to a normalized form, but it is allowed that the data is dynamically normalized when a feature value is determined or similar retrieval is executed.

Furthermore, the optimization calculation executed through the weighting-factor determination in step S103 is not restricted to the technique described for this embodiment, but it is allowed to use another well-known technique for optimization calculation.

Furthermore, it is allowed that the similarity-ranking change executed in step S106 uses a form of automatically recalculating a weighting factor whenever similarity-ranking change is executed instead of a form of designating recalculation of a weighting factor after repeating the similarity-ranking change a plurality of times.

A multimedia object purposed by this embodiment is not restricted to a three-dimensional object, but it is allowed to use a dynamic image.

By piling dynamic images as time-directional layers, information equivalent to three-dimensional volume data can be obtained.

Moreover, it is allowed to use music data. In this case, a feature value in a frequency region is obtained by Fourier-transforming the music data.

Furthermore, a change of amplitudes in a time region serves as a feature value.

Furthermore, it is possible to calculate a feature value in accordance with an image or picture generated by a tool for visualizing music data like a graphic equalizer.

Second Embodiment

A second embodiment of a multimedia-object-retrieval method and an apparatus of the present invention is applied to a building-material-retrieval system that can be used to build or revocate a house.

That is, the second embodiment can retrieve similar building materials when selecting various building materials such as doors or window frames as a building-material-retrieval system.

Figure 6:
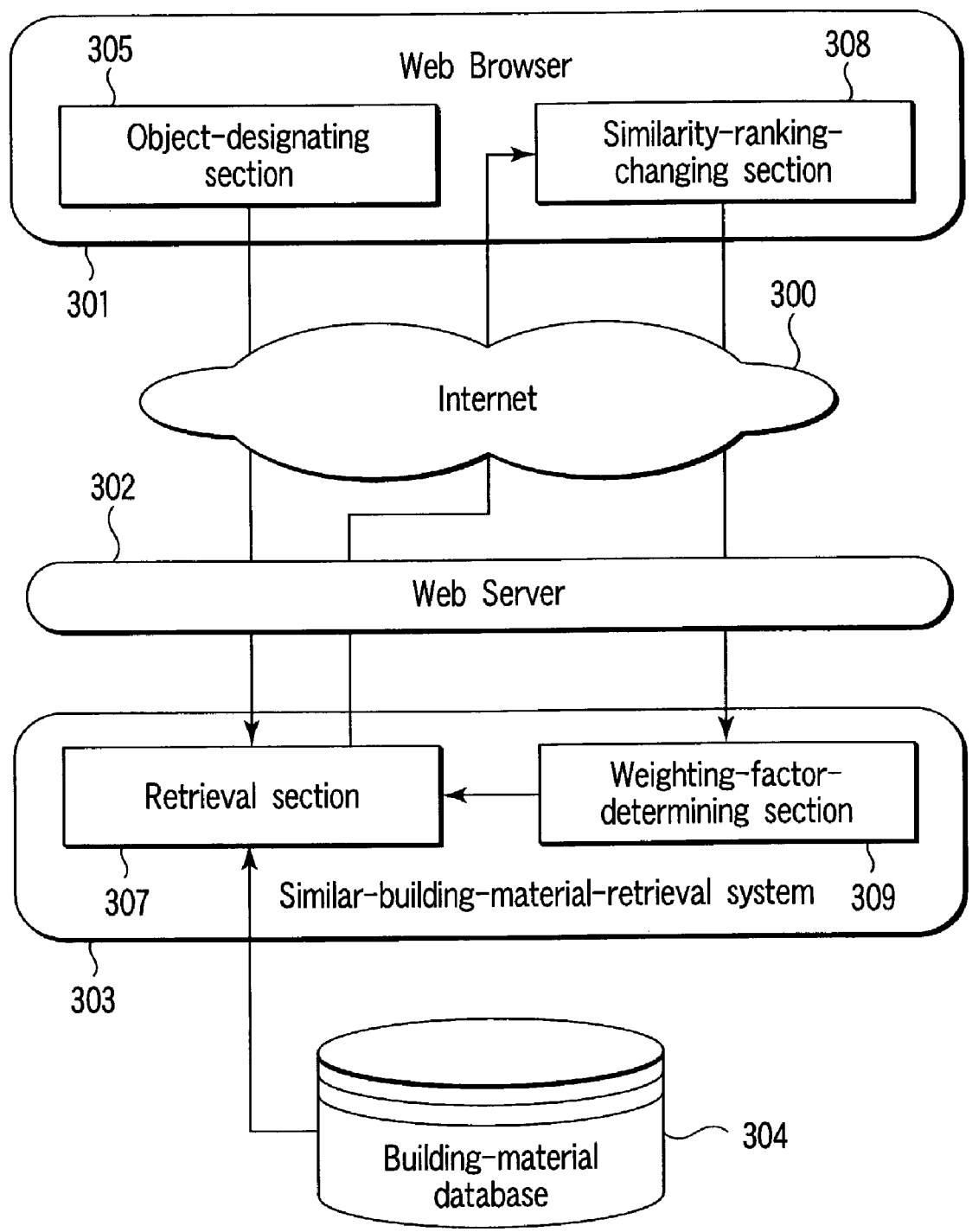
FIG. 6 is a block diagram showing a configuration of a multimedia-object-retrieval method and an apparatus to which a second embodiment of the present invention is applied.

FIG. 6 is a block diagram showing a configuration of the multimedia-object-retrieval method and apparatus to which the second embodiment of the present invention is applied.

As shown in FIG. 6, the second embodiment is provided with a web browser 301 (client) to be directly operated by a user and the web browser 301 is connected to the Internet 300 by an ADSL line.

A web server 302 is present at the connection destination of the web browser 301.

The web server 302 is connected to a similar-building-material-retrieval system 303 to be operated as a web application.

Moreover, the similar-building-material-retrieval system 303 is connected to a building-material database 304.

The similar-building-material-retrieval system 303 is constituted by one or more pieces of hardware in accordance with a distributed-network technology such as Java2EE.

The building-material database 304 stores information on maker names of building materials serving as house components such as doors, window frames, and wallpaper, model number, and price, image data and three-dimensional data for building materials, and various feature values calculated in accordance with the three-dimensional data and building-material image data.

In this case, feature values use a histogram obtained by quantizing a value for each color information such as RGB, HSV, or Lab which can be calculated for the texture of a three-dimensional object, a shape histogram obtained by quantizing edge differentiation, and volume and surface area of a three-dimensional object.

It is also allowed to select these feature values from various portions and use them as feature values separate from each other.

Feature values entered in the building-material database 304 are respectively normalized in accordance with the scale of each feature value.

The above web browser 301 includes an object-designating section 305 which realizes a user interface for designating a desired building material.

The object-designating section 305 is connected to a retrieval section 307 included in the similar-building-material-retrieval system 303 through the web browser 301 and the web server 302.

The retrieval section 307 is connected to a similarity-ranking-changing section 308 which realizes an interface for displaying a building material as a retrieval result and changing similarity rankings in the web browser 301 through the web server 302 and the web browser 301.

Moreover, the retrieval section 307 is connected to the building-material database 304.

The similarity-ranking-changing section 308 is connected to a weighting-factor-determining section 309 included in the similar-building-material-retrieval system 303 through the web browser 301 and the web server 302.

The weighting-factor-determining section 309 is connected to the retrieval section 307.

Figure 7:
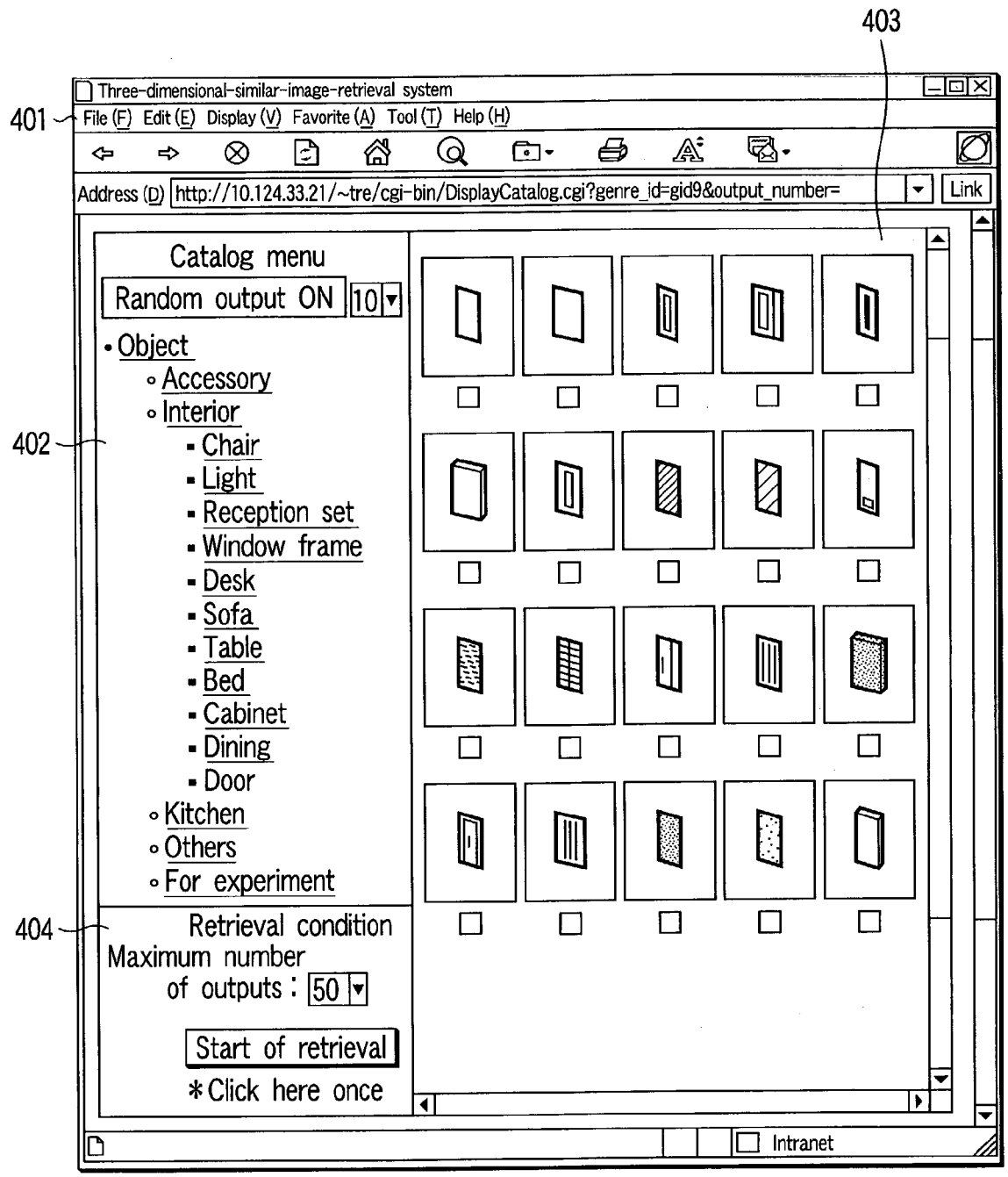
FIG. 7 is an illustration showing indications by a web browser 301 in FIG. 6.
Figure 8:
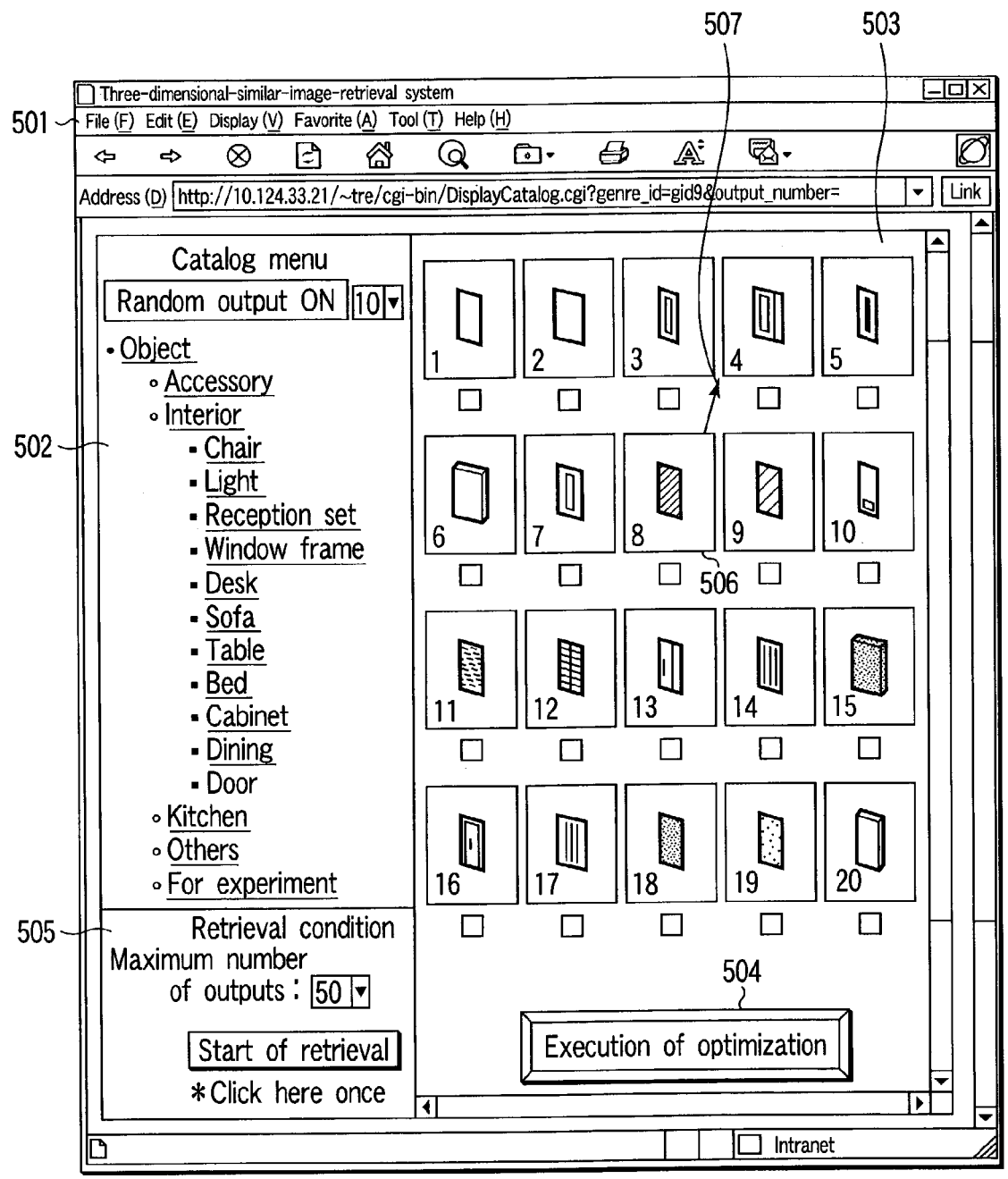
FIG. 8 is an illustration showing indications by the web browser 301 in FIG. 6.

FIGS. 7 and 8 show indications displayed on a not-illustrated display of the web browser 301.

A window 401 of the web browser 301 in FIG. 7 shows a state in which the object-designating section 305 in FIG. 6 functions.

The window 401 of the web browser 301 includes a catalog menu section 402 which displays genres of building materials, like a tree.

Moreover, the window 401 of the web browser 301 includes a building-material-displaying section 403 which displays building materials belonging to a selected genre.

Furthermore, the window 401 of the web browser 301 includes a retrieval-designating section 404 constituted by a button for starting the retrieval of a building material similar to a desired building material selected by a user and a field for designating the maximum number of outputs.

A window 501 of the web browser 301 in FIG. 8 shows a state in which the similarity-ranking-changing section 308 in FIG. 6 functions.

The window 501 of the web browser 301 includes a catalog menu section 502 which displays genres of building materials, like a tree.

Moreover, the window 501 of the web browser 301 includes a building-material-displaying section 503 which provides a user interface for displaying a result of similar retrieval and changing similarity rankings.

Furthermore, the window 501 of the web browser 301 includes a button 504 for starting weighting-factor optimization according to similarity-ranking change.

Furthermore, the window 501 of the web browser 301 includes a retrieval-designating section 505 constituted by a button for starting the retrieval of a building material similar to a desired building material selected by a user and a field for designating the maximum number of outputs.

Next, functions of the second embodiment of the present invention are described below.

A user first performs operations on the window 401 shown in FIG. 7.

The user selects the genre of a desired building material by clicking a genre name on the catalog menu section 402 of the window 401.

The building-material-displaying section of the window 401 displays a list of building materials included in the genre selected from the catalog menu section 402.

The window 401 in FIG. 7 shows a state in which a door is selected from the catalog menu section 402.

The user selects a desired building material by clicking a check box below the image of each building material displayed by the building-material-displaying section 403.

When the user selects one or more building materials similar to a desired building material and then clicks the retrieval start button of the retrieval-designating section 404, a designation for starting retrieval is sent to the similar-building-material-retrieval system 303 present on the Internet 300.

The user can designate the maximum number of outputs of retrieval results by operating the maximum-number-of-output field of a retrieval-designating section 464.

Then, the retrieval section 307 receives a desired-building-material ID sent from the window 401 in which the object-designating section 305 functions.

The retrieval section 307 reads a feature value from the building-material database 304 in accordance with the received desired building material ID.

Moreover, the retrieving section 307 reads feature values of all building materials necessary for retrieval from the building-material database 304.

Then, the retrieval section 307 performs similar retrieval in accordance with the feature value of the desired building material and feature values of all building materials to be retrieved.

Figure 9:
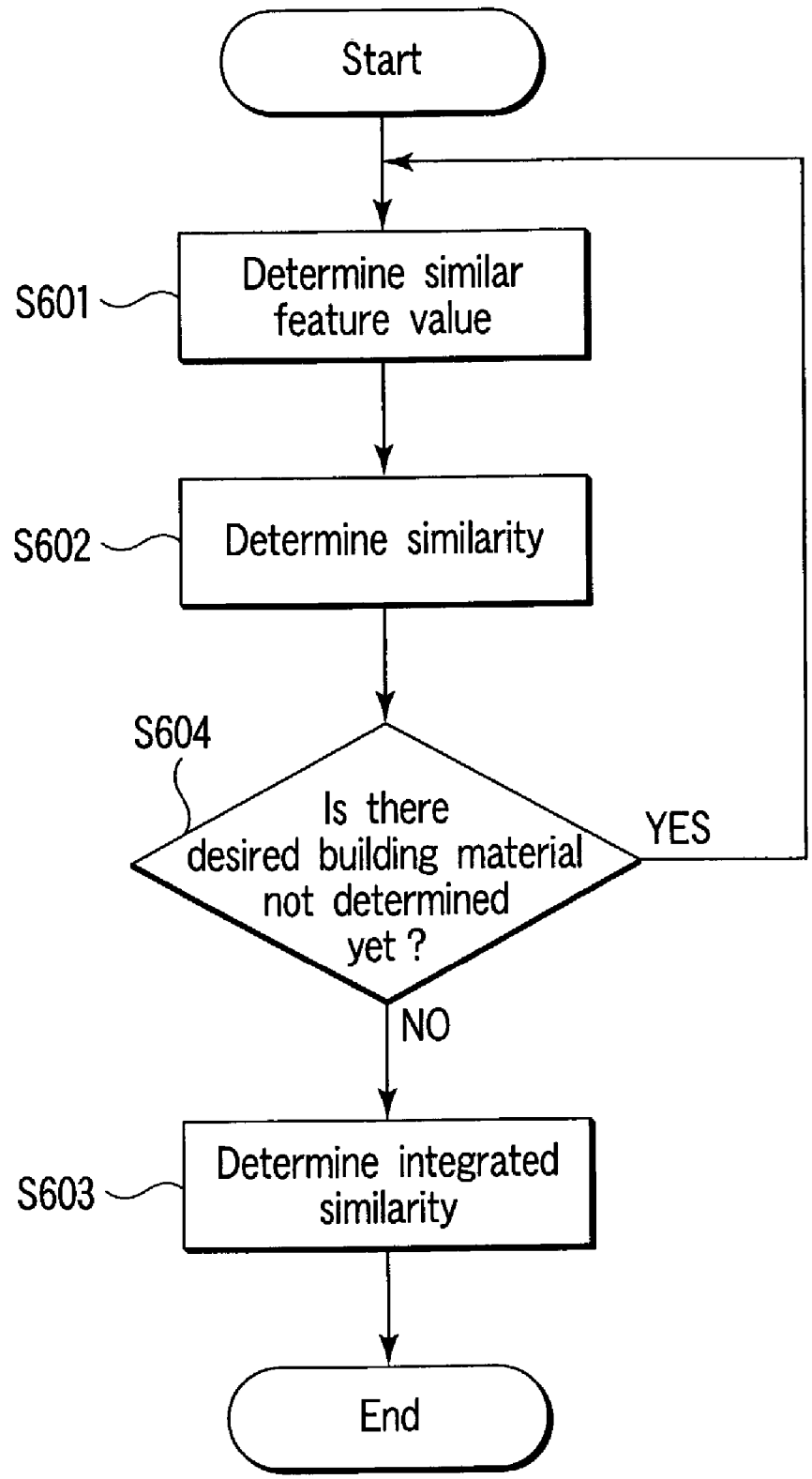
FIG. 9 is a flowchart for explaining a procedure of similarity calculation of a retrieval section 307 in FIG. 6.

FIG. 9 is a flowchart for explaining a procedure of similar calculation by the retrieval section 307.

First, in step S601, a similar feature value for one of desired building materials is calculated and determined.

In this case, as shown by the following expression (9), the similar feature value denotes the difference Fik between FOk expressing the feature value of a desired object k by a vector and Foi expressing the feature value of an object i to be retrieved by a vector.

$$Fik = FOi - FOk \qquad (9)$$

That is, the collection of similar feature value vectors obtained by subtracting the feature value of a desired building material k from feature value vectors of building materials is calculated and determined.

Then, in step S602, the similarity shown by the expression (1) is calculated and determined by multiplying a similar feature value by a weighing factor and calculating the sum of squares of each component.

In this case, the similarity denotes the inner product Sil between the similar feature value vector Fik of the object i to be retrieved to the desired object k determined in step S601 and a weighting factor W expressed by a vector as shown by the following expression (10).

The initial value of each component of the weighting-factor vector W is 1.0.

$$Sik = Fik \cdot W \qquad (10)$$

Then, in step S604, it is determined whether desired building materials not calculated yet are present about calculation of similarity.

In this case, when desired building materials not calculated yet are present, step S601 is restarted to calculate the similarity of one of the desired building materials not calculated yet.

In this case, a suffix showing the ID of a desired building material is advanced from k to l and the similarity Si of the object i to be retrieved for the desired building material l is further obtained.

Moreover, when no desired building material not calculated yet is present about similarity calculation, the retrieval section 307 starts the processing in step S603.

In step S603, the integrated similarity Si for each object to be retrieved is calculated by obtaining the sum of similarities Sik calculated for desired building materials as shown in the following expression (11).

$$Si = Sik + Sil + \ldots + Siz \qquad (11)$$

In the above expression, the suffixes k, l, and z respectively show the ID of each desired building material.

Moreover, the retrieval section 307 sorts each building-material data including image data and/or three-dimensional data in accordance with the integrated similarity Si of the calculated building materials to be retrieved and transmits the building-material data as the retrieval result data to the window 501 in FIG. 8 in which the similarity-ranking-changing section 308 functions.

The similarity-ranking-changing section 308 draws the contents of the building-material-displaying section 503 included in the window 501 shown in FIG. 8 in accordance with the retrieval result data transmitted from the retrieval section 307.

Moreover, the similarity-ranking-changing section 308 draws the catalog menu section 502, optimization-executing button 504, and retrieval-designating section 505 and displays them on the window 501.

A user can move the building materials displayed by the building-material-displaying section 503 through drag-and-drop.

For example, when the user drags and drops a building material 506 having the similarity ranking 8 between the building material having the similarity ranking 3 and the building material having the similarity ranking 4 in accordance with an arrow 507 in FIG. 8, the similarity ranking of the building material 506 becomes 4 and that of a building material having a similarity ranking of 4 to 7 changes from 5 to 8.

In this case, the similarity-ranking-changing section 308 stores the ID of the building material 506 as a similarity-ranking-changed building material.

The user can repeat the above operations until a state close to his/her similarity-ranking evaluation is obtained.

Moreover, the similarity-ranking-changing section 308 additionally stores the ID of a similarity-ranking-changed building material for each operation repeatedly performed.

The flash technique such as drag-and-drop in the web browser 301 is used to realize the above user interface.

When the user clicks the optimization-executing button 504 after similarity-ranking change is completed, the similarity-ranking-changing section 308 transmits the ID of the building material stored as a similarity-ranking-changed building material and IDs of building materials located before and after the similarity ranking of each building material to the weighting-factor-determining section 309.

Moreover, the user can perform new retrieval by checking a check box corresponding to each building material displayed by the building-material-displaying section 503 and clicking a retrieval-starting button included in the retrieval-designating section 505.

Then, the weighing-factor-deciding section 309 carries out processing for deciding the weighing factor in accordance with the flowchart shown in FIG. 5.

The processing content in each step is the same as the case of the first embodiment.

That is, the weighting-factor-determining section 309 transmits the decided optimum weighting factor to the retrieval section 307.

The retrieval section 307 retries similar retrieval in accordance with the flowchart shown in FIG. 9.

However, the retrieval section 307 performs similar retrieval by using the optimum weighting factor decided by the weighting-factor-determining section 309 as a weighting-factor vector W used for similarity calculation.

Moreover, the retrieval section 307 transmits the result data of the similar retrieval performed by using the optimum weighting factor to the similarity-ranking-changing section 308 again.

The user can change similarity rankings of building materials displayed on the window 501.

The user retrieves a building material similar to a desired building material by repeating the above operations.

Next, advantages of the second embodiment of the present invention are described below.

The similarity-ranking change by the similarity-ranking-changing section 308 can be performed by noting only the relative similarity between a building material designated to change similarity rankings and a building material located at a similarity-ranking-change destination.

To determine whether a certain building material is similar to a desired building material, it is difficult for a user to recognize a building material located at the boundary between the evaluation that the building material is similar to the desired building material and the evaluation that the building material is not similar to the desired building material.

However, it is easy to determine the relative similarity between a certain building material and another building material like the case of this embodiment.

As a result, the user can easily perform the similarity-ranking change reflecting his/her purpose and efficiently retrieve a building material similar to his/her desired building material.

In the case of the weighting-factor decision performed by the weighting-factor-determining section 309, the whole weighting factor is decided through the optimization calculation in accordance with the similarity-ranking change locally performed by a user by the similarity-ranking-changing section 308.

As a result, when the user moves a narrow door 506 shown in FIG. 8 along an arrow 507, the user can obtain a result in which doors having the characteristic that their widths are small are collected on a high order without manually changing similarity rankings.

Thus, by changing similarities of some building materials and deciding weighting factors through optimization calculation, similarity rankings of another building material having the same characteristic as the above building materials are similarly changed.

As a result, the user can easily reflect his/her purpose on the whole by changing similarity rankings of some building materials and efficiently retrieve a building material similar to his/her desired building material through few operations.

The connection mode of the web browser 301 to the Internet 300 directly performed by a user is not restricted to an ADSL line but includes any other connection modes.

Moreover, it is allowed that the web browser 301 and web server 302 are connected each other via a LAN or the same hardware not via the Internet 300.

Furthermore, it is allowed to use a mode in which functions of a web server are incorporated into the similar-building-material-retrieval system 303.

Furthermore, an object to be retrieved is not restricted to a building material but includes a multimedia object that is digital data including a three-dimensional object such as an interior, dynamic and static images, music, and voice.

Furthermore, the feature value data entered in the building-material database 304 is not restricted to a normalized mode, but it is allowed that the data is a mode to be dynamically normalized when similar retrieval is executed.

Furthermore, it is allowed that the similarity-ranking change performed by the similarity-ranking-changing section 308 is not a mode for a user to perform the change several times, then to click the optimization-executing button 504, and to transmit the ID or the like of a similarity-ranking-changed building material but a mode for automatically transmitting the ID or the like of the similarity-ranking-changed building material whenever the similarity-ranking change is performed and performing weighting-factor optimization and similar retrieval.

Furthermore, the database 304 is not restricted to the arrangement in FIG. 6, but it is allowed to change functional arrangements and change some arrangements of functions.

For example, it is allowed to use a mode in which the building-material database 304 is included in the retrieving section 307.

Furthermore, it is allowed that some of the calculation parts by the weighing-factor-determining section 309 are arranged in the web browser 301.

Therefore, as described above, the present invention can provide a multimedia-object-retrieval method and a system capable of converting the purpose of a user into a weighting factor and efficiently retrieving a desired object group by relatively changing similarity rankings of objects ranked as retrieval results.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multimedia-object-display method comprising:

calculating a similarity of each of a plurality of multimedia objects stored in a database;

displaying the plurality of multimedia objects on a display in order of the calculated similarities, the plurality of multimedia objects including at least first, second, third multimedia objects and other multimedia objects;

changing the displayed order of the plurality of multimedia objects on the display by a user performing dragging-and-dropping of the first multimedia object between the second multimedia object and the third multimedia object so as to change the similarity order;

recalculating similarities of the displayed multimedia objects based on the user's display order change by considering only the first, second and third multimedia objects, and displaying the plurality of multimedia objects in an order based on the recalculated similarities on the same display.

2. A multimedia-object-display method according to claim 1, wherein the similarity of each of the plurality of multimedia objects is calculated based on feature value and weighing factor.

3. A multimedia-object-display method according to claim 1, wherein the calculation of similarity of each of the plurality of multimedia objects is performed based on a corresponding feature value and weighing factor.

4. A multimedia-object-display system comprising:

a display;

an input unit; and an arithmetic unit having functions of:

calculating a similarity of each of a plurality of multimedia objects stored in a database;

displaying the plurality of multimedia objects on the display in order of the calculated similarities, the plurality of multimedia objects including at least first, second, third multimedia objects and other multimedia objects;

changing the displayed order of the plurality of multimedia objects on the display by a user performing dragging-and-dropping of the first multimedia object between the second multimedia object and the third multimedia object with the input unit so as to change the similarity order;

recalculating similarities of the displayed multimedia objects based on the user's display order change by considering only the first, second and third multimedia objects; and displaying the plurality of multimedia objects in an order based on the recalculated similarities on the same display.

* * * * *